(12) United States Patent
Claus et al.

(10) Patent No.: US 8,465,209 B2
(45) Date of Patent: Jun. 18, 2013

(54) CAGE FOR RADIAL ROLLER BEARINGS WITH LIMITED WIDTH AVAILABILITY

(75) Inventors: Seth Claus, Charlotte, NC (US); Dennis Roffe, Tega Cay, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 171 days.

(21) Appl. No.: 13/048,386

(22) Filed: Mar. 15, 2011

(65) Prior Publication Data
US 2011/0235959 A1 Sep. 29, 2011

Related U.S. Application Data

(60) Provisional application No. 61/317,061, filed on Mar. 24, 2010.

(51) Int. Cl.
*F16C 33/46* (2006.01)

(52) U.S. Cl.
USPC ............................................ 384/572; 384/575

(58) Field of Classification Search
USPC .................. 384/572, 575, 576, 580
See application file for complete search history.

(56) References Cited

U.S. PATENT DOCUMENTS

| 1,402,071 | A | * | 1/1922 | Huther | 384/571 |
| 1,440,312 | A | * | 12/1922 | Neal | 384/575 |
| 2,015,229 | A | * | 9/1935 | Tyson | 384/575 |
| 2,435,839 | A | * | 2/1948 | McNicoll | 384/575 |
| 3,310,351 | A | * | 3/1967 | Ortegren | 384/575 |
| 3,802,754 | A | * | 4/1974 | Pitner | 384/580 |
| 3,940,193 | A | * | 2/1976 | Molloy | 384/580 |
| 4,174,138 | A | * | 11/1979 | Johnston | 384/623 |
| 5,009,525 | A | * | 4/1991 | Brockmuller et al. | 384/576 |
| 5,516,215 | A | * | 5/1996 | Bergmann | 384/560 |
| 5,538,348 | A | * | 7/1996 | Honda et al. | 384/572 |
| 2009/0080825 | A1 | * | 3/2009 | Koda | 384/572 |

FOREIGN PATENT DOCUMENTS

| DE | 1948219 U | 10/1966 |
| DE | 1959378 U | 4/1967 |

* cited by examiner

*Primary Examiner* — Thomas R Hannon
(74) *Attorney, Agent, or Firm* — Lucas & Mercanti, LLP

(57) ABSTRACT

A cage for a radial roller bearing of limited width availability, which has a first flange, a second flange spaced from the first flange, and cage bars that extend between the first flange and the second flange so as to form a plurality of roller pockets. The cage bars, together with the first flange and the second flange form an S-shaped or a Z-shaped contour. The cage aids in properly guiding roller elements in bearings of limited widths. The cage prevents rolling elements from overrunning or under running the cage bar. The cage also provides for proper contact of the rolling elements to push the cage around the radial bearing. Further, the cage allows for inner retention, outer retention, or both inner and outer retention of the rolling elements.

9 Claims, 3 Drawing Sheets

CAGE FOR RADIAL ROLLER BEARINGS WITH LIMITED WIDTH AVAILABILITY

FIELD OF INVENTION

The present invention relates to radial roller bearings and more particularly to radial roller bearings used in applications with space constraints pertaining to the width of the bearing.

BACKGROUND OF THE INVENTION

Radial bearings are typically comprised of needle rolling elements or cylindrical rolling elements, such as drawn cup needle roller bearings, cylindrical roller bearings with machined race(s), rolling elements, and cage assemblies. The cage assemblies include a first flange, a second flange, and web-like cage bars that connect the first flange and the second flange. Currently, various cage profiles, including straight cages and cages which resemble the letters W, M, V, A, and U in axial cross-section, are known and used in radial roller bearing applications. A straight cage or a cage having a U-profile is used with rolling elements of limited length. However, these cages do not provide a portion of the cage bar for the rolling elements to push against at or near the pitch. The current production cages also cannot maintain a portion of the cage bar at or above the bearing pitch, at or below the bearing pitch, or both above and below the bearing while maintaining rolling element retention.

Currently, when axial width is limited the entire cage bar is located either above the bearing pitch or below the bearing pitch. This allows rolling elements to over-run the cage bar or go below the cage bar. When this occurs, the cage bar can become damaged, which could lead to bearing failure.

Presently, a straight cage or a cage having a U-profile is typically used with rolling elements of limited lengths. However, the straight or U-profile cage is pushed by the rolling elements below the pitch of the bearing only. In certain conditions, the rolling elements can over-run the bar and damage it, causing bearing failure. Also, straight or U-profile cages only provide inner retention for rolling elements. Thus, the current cage design for radial bearings of limited width does not properly guide rolling elements, does not prevent rolling elements from overrunning cage bars, does not provide proper contact of rolling elements to push the cage around, and does not provide inner and outer retention of rolling elements as needed.

Radial roller bearings requiring both inner and outer retention (i.e., rolling element and cage assemblies) are typically manufactured with M-profile or W-profile cages. However, for applications of limited width, M-profile or W-profile cages cannot be used because those cage profiles are not conducive to the reduction of cage width. Neither the M-profile cage nor the W-profile cage is wide enough to have both inner retention and outer retention and/or cannot be manufactured.

SUMMARY OF THE INVENTION

The present invention is directed to a radial bearing cage, which has a cage profile resembling the letter "S" or "Z" in axial cross-section. The cage provides a means for a bearing of limited width to properly guide rolling elements. Also, the cage prevents rolling elements from overrunning the cage bars. Moreover, the cage provides for proper contact of the rolling elements to push the cage around the radial roller bearing. Furthermore, the cage provides inner retention and/or outer retention of rolling elements.

The present invention allows the rolling elements to push the cage bar above or below the pitch of the roller bearing while still maintaining inner rolling retention and/or outer rolling retention. Thus, the S-profile or Z-profile enables part of the cage bar to be located below the bearing pitch to maintain inner retention and the other part of the cage bar to be located above the bearing pitch to maintain outer retention, if required. By having a portion of the cage bar above and below the bearing pitch, the forces against the cage bar are more evenly distributed against the cage bar as a whole.

For a radial roller bearing requiring only inner retention, the present invention has a portion of the cage bar located below the bearing pitch for retention and a portion of the cage bar located at or above the bearing pitch so that the rolling element cannot overrun the cage bar and cause cage damage or failure.

For a radial roller bearing requiring only outer retention, the present invention has a portion of the cage bar located above the bearing pitch for retention and a portion of the cage bar located at or below the bearing pitch so that the rolling element cannot go below the cage bar and cause cage damage or failure.

For a radial roller bearing requiring both inner retention and outer retention, a portion of the cage bar of the present invention is located below the bearing pitch and a portion of the cage bar is located above the bearing pitch. Thus, the present invention allows for roller element retention for roller bearings that require both inner retention and outer retention.

Preferably, the cage of the present invention is made of steel. However, the cage can be plastic as well.

Broadly, the present invention can be defined as a cage for a radial roller bearing of limited width availability which comprises a first flange, a second flange spaced from the first flange, and cage bars that extend between the first flange and the second flange so as to form a plurality of roller pockets. The cage bars, together with the first flange and the second flange form an S-shaped or a Z-shaped contour.

In an additional embodiment, a rolling element is arranged in each of the roller pockets.

In a further embodiment, the roller bearing has a centrally located pitch.

In yet a further embodiment, the cage bars are arranged relative to the pitch so that the rolling element is maintained in the pockets and cannot fall out of the cage.

In yet a further embodiment, the inner surface of the first flange and the inner surface of the second flange secure the rolling elements axially within each of the roller pockets.

In another embodiment, an inner ring arranged to provide inner retention and the cage bar provides outer retention for the rolling elements.

In yet another embodiment, an outer ring arranged to provide outer retention and the cage bar provides inner retention for the rolling elements.

In a further embodiment, for both inner retention and outer retention, a portion of the cage bar is located below the bearing pitch and a portion of the cage bar is located above the bearing pitch.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
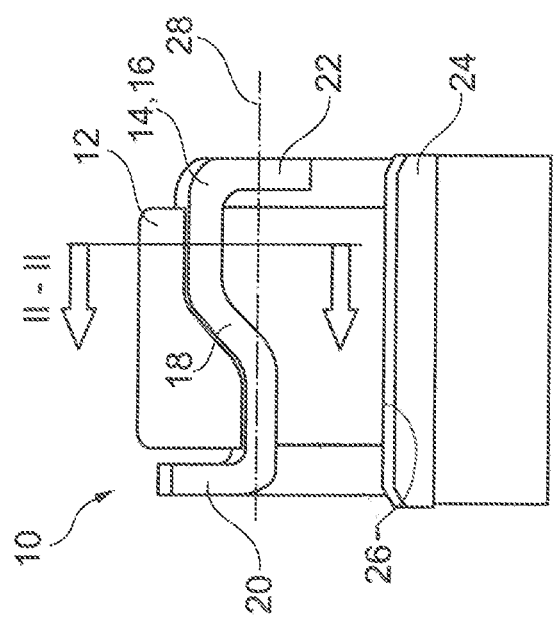
FIG. 1 is a cross-sectional view illustrating a radial roller bearing cage with a cage bar configured above the pitch of a rolling element and at the pitch of the rolling element providing radially outer retention for the rolling element, and an inner ring, which ensures inner retention of the rolling elements.

Referring now to the drawings, in which like reference numerals refer to like reference parts throughout, FIG. 1 shows a cross-sectional view of a radial roller bearing 10 and a rolling element 12 with a cage 14 profiled for outer retention of the rolling element 12. The profile of the cage 14, which has a bar 18 and radial flanges 20, 22, resembles the letter "S" or "Z" in cross-section. To ensure the rolling element 12 does not fall out of the profiled cage 14, an inner ring 24 is used. The inner ring 24 has a raceway 26 for the rolling elements 12 and guarantees inner retention of the rolling elements 12. The cage bar 18 is configured above the bearing pitch 28 of the rolling element 12 and at the bearing pitch 28 of the rolling element 12, providing radially outer retention for the rolling element 12 so that the rolling element 12 cannot overrun the cage 14 and fall out of the cage 14.

Figure 2:
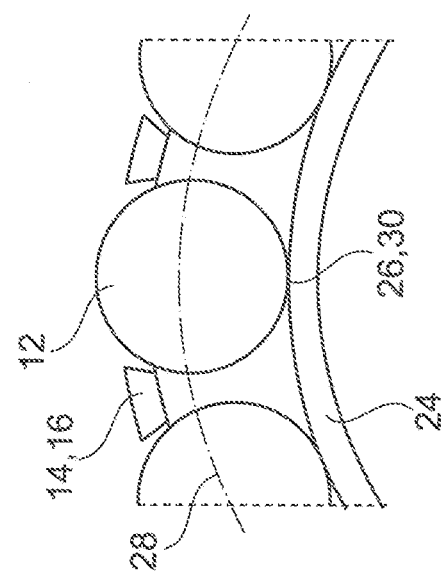
FIG. 2 is a cross-sectional view taken along the line II-II in FIG. 1.

FIG. 2 shows a cross-sectional view taken along line II-II in FIG. 1 of the radial roller bearing 10 and rolling element 12 with the profiled cage 14 for outer retention 16 and the inner ring 24, which provides inner retention 30.

Figure 3:
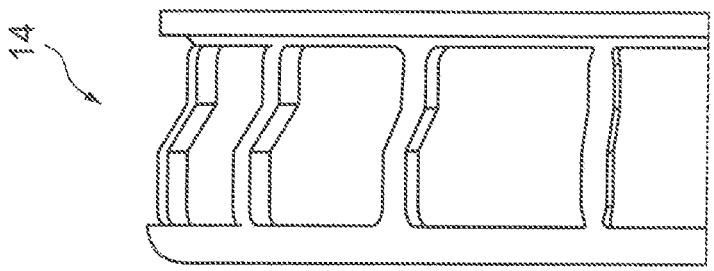
FIG. 3 is a top view illustrating the cage providing outer retention.

FIG. 3 shows a top view of the profiled cage 14, which provides outer retention 16.

Figure 4:
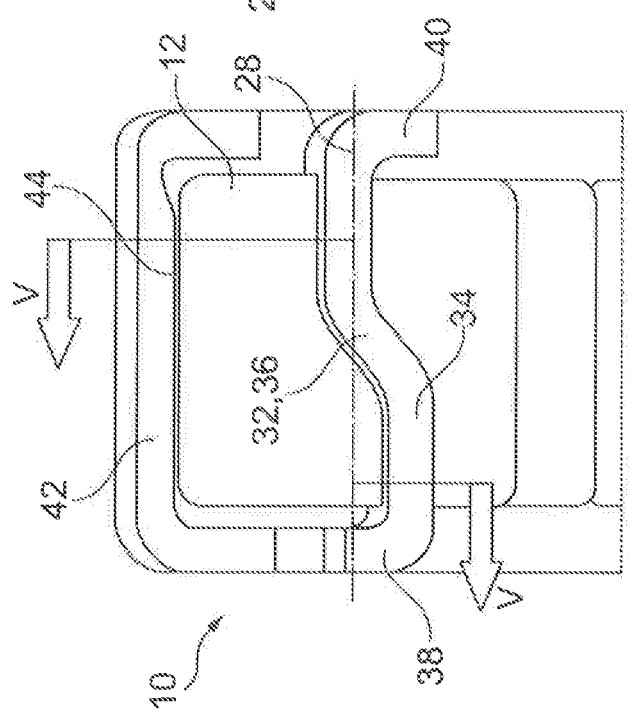
FIG. 4 is a cross-sectional view illustrating a radial roller bearing cage with a cage bar configured below the pitch of a rolling element and at the pitch of the rolling element providing radially inner retention for the rolling element, and an outer ring, which ensures outer retention of the rolling elements.

FIG. 4 shows a cross-sectional view of a radial roller bearing 10 and a rolling element 12 with a cage 32 for inner retention 34. The profile of the cage 32, which has a bar 36 and radial flanges 38, 40, again resembles the letter "S" or "Z" in cross-section. To ensure the rolling element 12 does not fall out of the cage 32, an outer ring 42 is used. The outer ring 42 has a raceway 44 for the rolling element 12 and guarantees outer retention 46 of the rolling element 12. The cage bar 36 is configured below the bearing pitch 28 of the rolling element 12 and at the bearing pitch 28 of the rolling element 12, providing radially inner retention for the rolling element 12 so that the rolling element 12 cannot under run the cage 32 and fall out of the cage 32.

Figure 5:
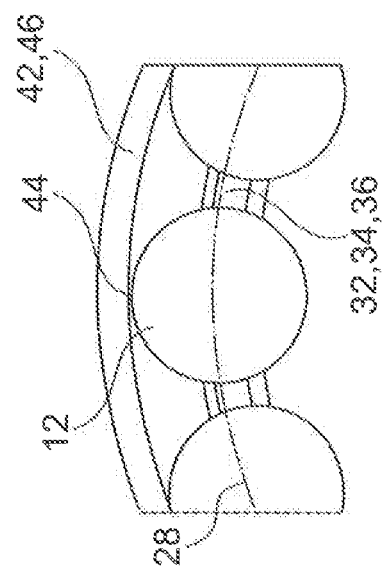
FIG. 5 is a cross-sectional view taken along the line V-V in FIG. 4.

FIG. 5 shows a cross-sectional view, taken along line V-V in FIG. 4, of the radial roller bearing 10 and rolling element 12 with the cage 32 which provides inner retention and the outer ring 42 that provides outer retention 46.

Figure 6:
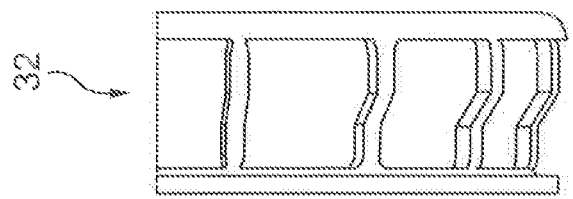
FIG. 6 is a top view illustrating the cage providing inner retention.

FIG. 6 shows a top view of the cage 32, which provides inner retention 46.

Figure 7:
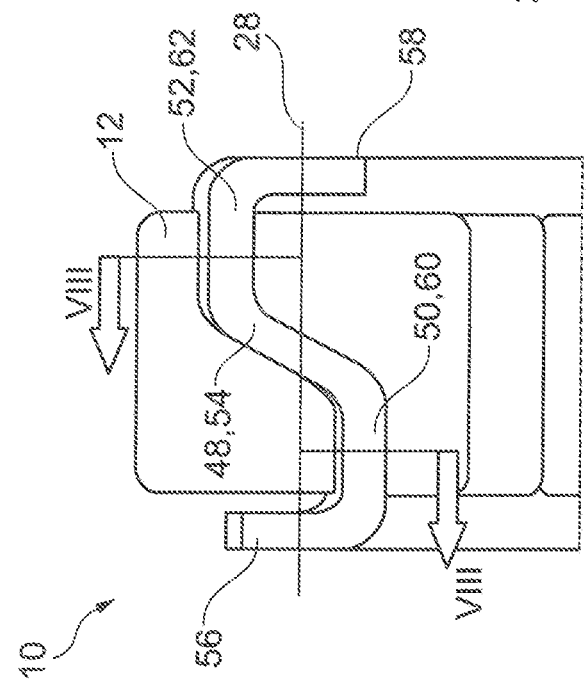
FIG. 7 is a cross-sectional view illustrating a radial roller bearing with a cage bar configured above and below the pitch of a rolling element providing both inner retention and outer retention.

FIG. 7 shows a cross-sectional view of a radial roller bearing 10 and a rolling element 12 with a cage 48 that provides both inner retention 50 and outer retention 52. The profile of the cage 48, which has a bar 54 and radial flanges 56, 58, again resembles the letter "S" or "Z" in cross-section. In this configuration, neither an inner ring, nor an outer ring is required. The bottom portion 60 of the bar 54 retains the rolling element 12 from falling out of the radial internal portion of the roller bearing 10 and the top portion 62 of the bar 54 retains the rolling element 12 from falling out of the radially outer portion of the roller bearing 10. The cage bar 54 is centered on the bearing pitch 28 so that the rolling element 12 cannot overrun or under run the cage 48.

Figure 8:
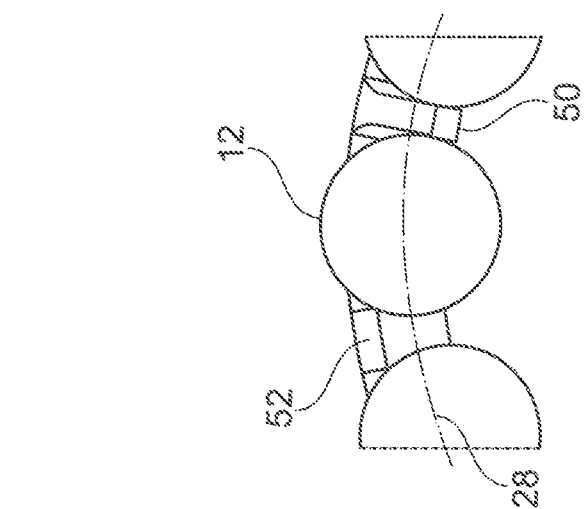
FIG. 8 is a cross-sectional view taken along the line VIII-VIII in FIG. 7.

FIG. 8 shows a cross-sectional view, taken along line VIII-VIII in FIG. 7, of the radial roller bearing 10 and rolling elements 12 with the cage 48 for both inner retention 50 and outer retention 52.

Figure 9:
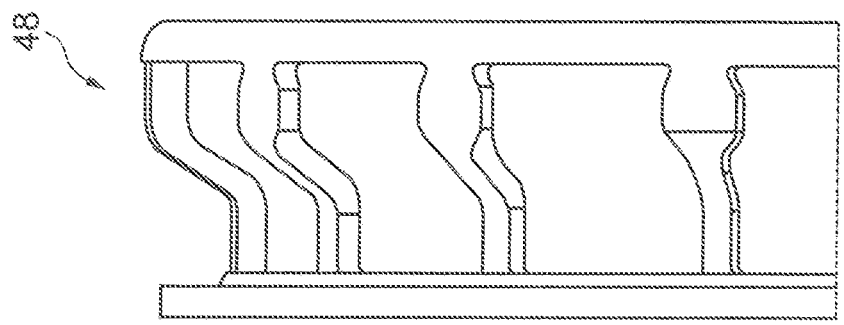
FIG. 9 is a top view illustrating the cage providing both inner retention and outer retention.

FIG. 9 shows a top view of the cage 48 for both inner retention 50 and outer retention 52.

The present invention has been described with reference to a preferred embodiment. It should be understood that the scope of the present invention is defined by the claims and is not intended to be limited to the specific embodiment disclosed herein.

What is claimed:

1. A cage for rolling elements of a radial roller bearing, comprising:
   a first flange;
   a second flange spaced from the first flange; and
   cage bars extending between the first flange and the second flange so as to form a plurality of roller pockets, the cage bars, together with the first flange and the second flange forming an S-shaped or a Z-shaped contour;
   the roller bearing having a centrally located pitch;
   each of the cage bars comprising a first section connected to the first flange, a second section connected to the second flange, and a transition section connecting the first section and the second section;
   the first section being disposed one of:
      above the pitch for providing a radially outer retention of the rolling elements; and
      below the pitch for providing a radially inner retention of the rolling elements;
   the first flange extending from the first section toward the pitch; and
   the second section being disposed at the pitch or at the other of above the pitch and below the pitch.

2. The cage of claim 1, wherein a rolling element is arranged in each of the roller pockets.

3. The cage of claim 2, wherein an inner surface of the first flange and an inner surface of the second flange secure the rolling element axially within each of the roller pockets.

4. The cage of claim 2, wherein the first section of the cage bar is disposed below the bearing pitch to provide inner retention of the rolling elements and the second section of the cage bar is disposed above the bearing pitch to provide outer retention of the rolling elements.

5. The cage of claim 1, wherein the cage bars are arranged relative to the pitch so that the rolling element is maintained in the pockets and cannot fall out of the cage.

6. The cage of claim 1, wherein the first section of the cage bar provides outer retention for the rolling elements and the second section of the cage bar is disposed at the pitch.

7. The cage of claim 1, wherein the first section of the cage bar provides inner retention for the rolling elements and the second section of the cage bar is disposed at the pitch.

8. The cage of claim 1, wherein the cage is steel.

9. The cage of claim 1, wherein the cage is plastic.

* * * * *